(12) United States Patent
Rümping et al.

(10) Patent No.: US 9,592,606 B2
(45) Date of Patent: Mar. 14, 2017

(54) METHOD AND CONTROL MEANS FOR CONTROLLING A ROBOT

(75) Inventors: Jonas Rümping, München (DE); Christian Sonner, München (DE)

(73) Assignee: KUKA Roboter GmbH, Augsburg (DE)

( * ) Notice: Subject to any disclaimer, the term of this patent is extended or adjusted under 35 U.S.C. 154(b) by 46 days.

(21) Appl. No.: 14/130,168

(22) PCT Filed: Jun. 6, 2012

(86) PCT No.: PCT/EP2012/002422
§ 371 (c)(1),
(2), (4) Date: Mar. 27, 2014

(87) PCT Pub. No.: WO2013/004329
PCT Pub. Date: Jan. 10, 2013

(65) Prior Publication Data
US 2014/0229006 A1    Aug. 14, 2014

(30) Foreign Application Priority Data
Jul. 1, 2011    (DE) .......... 10 2011 106 321

(51) Int. Cl.
B25J 9/16    (2006.01)
(52) U.S. Cl.
CPC .......... B25J 9/1643 (2013.01); B25J 9/1676 (2013.01); *G05B 2219/39086* (2013.01); *G05B 2219/40369* (2013.01); *Y10S 901/49* (2013.01)
(58) Field of Classification Search
CPC .................. B25J 9/1676; B25J 9/1643; G05B 2219/39086; G05B 2219/40369; Y10S 901/49

USPC ............................................. 700/255; 901/49
See application file for complete search history.

(56) References Cited

U.S. PATENT DOCUMENTS

| 4,973,215 A * | 11/1990 | Karlen ........................ B25J 9/04 414/729 |
| 5,294,873 A | 3/1994 | Seraji |
| 5,737,500 A | 4/1998 | Seraji et al. |
| 2004/0260481 A1* | 12/2004 | Heiligensetzer et al. ...... 702/33 |
| 2008/0203230 A1 | 8/2008 | Ogo et al. |
| 2010/0243344 A1* | 9/2010 | Wyrobek ................. B25J 5/007 180/21 |

FOREIGN PATENT DOCUMENTS

| AT | 401746 B | 11/1996 |
| CN | 1873572 A | 12/2006 |

(Continued)

OTHER PUBLICATIONS

Walker, Impact Configurations and Measures for Kinematically Redundant and Multiple Armed Robot Systems, IEEE Transactions on Robotics and Automation, vol. 10 No. 5, 1994.*

(Continued)

*Primary Examiner* — Abby Lin
(74) *Attorney, Agent, or Firm* — Wood Herron & Evans LLP

(57) ABSTRACT

According to a method according to the invention for controlling a robot, in particular a human-collaborating robot, a robot- or task-specific redundancy of the robot is resolved, wherein, in order to resolve the redundancy, a pose-dependent inertia variable of the robot is minimized.

14 Claims, 1 Drawing Sheet

(56) References Cited

FOREIGN PATENT DOCUMENTS

| CN | 101890718 A | 11/2010 | | |
|---|---|---|---|---|
| DE | 19810341 A1 | 9/1999 | | |
| DE | 102004021468 A1 | 11/2005 | | |
| DE | 102005054575 B3 | 4/2007 | | |
| EP | 1974869 A1 | 10/2008 | | |
| WO | WO 2010108518 A1 | * | 9/2010 | B25J 9/16 |

OTHER PUBLICATIONS

Khatib, Inertial Properties in Robotic Manipulation: An Object-Level Framework, International Journal of Robotics Research, vol. 14. No. 1, Feb. 1994.*

Byung Rok et al, Robot Motion Generation Considering External and Internal Impulses, International Conference on Intelligent Robots and Systems, Aug. 2005.*

SK Saha, Intro to Robotics, McGraw Hill Companies, 2008.*

Kazuya Yoshida et al, Impact Dynamics of Space Long Reach Manipulators, IEEE proceedings of International Conference on Robotics and Automation, 1996.*

Oleskya Ogorodnikova, How Safe the Human-Robot Coexistence Is?, Acta Polytechnica Hungarica, 2009.*

Chinese Patent Office; The First Office Action and Search Report in CN Application No. 201280033145.0 dated Feb. 27, 2015 (and English Translation); 15 pages.

Walker, I.D., "Impact configurations and measures for kinematically redundant and multiple armed robot systems," Robotics and Automation, Oct. 1994, pp. 670-683, vol. 10, Issue 5, IEEE Transactions (Abstract Only), 1 page.

So, Byung Rok, et al., "Robot Motion Generation Considering External and Internal Impulses," International Conference on Intelligent Robots and Systems, Aug. 2005, pp. 948-953, IEEE(Abstract Only), 2 pages.

European Patent Office; Search Report in International Patent Application No. PCT/EP2012/002422 dated Aug. 10, 2012; 6 pages.

German Patent Office; Search Report in German Patent Application No. 10 2011 106 321.1 dated Aug. 7, 2013; 8 pages.

* cited by examiner

METHOD AND CONTROL MEANS FOR CONTROLLING A ROBOT

TECHNICAL FIELD

The present invention relates to a method and control means for controlling a robot, in particular human-collaborating robot while resolving a robot- or task-specific redundancy.

BACKGROUND

Presently designated as a human-collaborating robot in particular is a robot that physically interacts with a human being, for example by providing for a stay of the human being in a workspace of the robot. In particular in the case of such robot applications it is desirable to reduce the consequences of a collision of a contact point of the robot with its surroundings, in particular the human being. Up to now, to this end, for example under ISO-10218, limits were predefined, for example a maximum TCP speed of 0.2 to 0.25 m/s. However, this worst-case approach impedes the performance of in particular human-collaborating robots.

SUMMARY

In general the pose or position of a robot can be unambiguously described with f degrees of freedom by its joint coordinates $q \in \Re^f$. At the same time, the position and orientation of a reference point or system of the robot, in particular of its TCP, can be predefined by its coordinates $z^T = (x^T \in \Re^{m \leq 3} \alpha^T \in \Re^{n \leq 3})$, where x for example describes the Cartesian coordinates of the TCP, α describes its orientation, say in Euler or Cardan angles. The difference f−(m+n) defines the redundancy of the manipulator. A robot-specific redundancy always arises when the manipulator has more than 6 degrees of freedom or joints, while a task-specific redundancy arises when fewer reference point coordinates are predefined than the manipulator has degrees of freedom, for example only the position of the TCP of a six-axle robot f−(m+n)=6−(3+0)=3). For more compact representation, also a six-axle manipulator with one or more additional axles, for example a portal or a tool bench, as well as a system of several manipulators cooperating with one another are generally referred to as a robot in terms of the present invention.

Descriptively, a redundant robot can constitute a predefined reference point coordinate vector in at least two, in particular in an infinite number of different redundant poses. In order to determine control quantities for the joint drives of the robot from predefined reference point coordinates, the redundancy must thus be resolved by calculation or one of the redundant poses must be selected.

To this end, up to now different quality criteria were minimized: thus the redundancy can be used to minimize the reciprocal value of the distance to singular poses and/or obstacles, to plan energy-efficient paths or the like.

The problem addressed by the present invention is that of improving the operation of a robot, in particular of a human-collaborating robot.

This problem is solved by a method with the features of claim 1 or a control means with the features of claim 10. Claim 11 protects a computer program product, in particular a storage medium or a permanent or volatile storage medium with a computer program for carrying out an inventive method stored on it, the subsidiary claims relate to advantageous improvements. A means in terms of the present invention can be designed likewise by software or by hardware; in particular it can comprise a program or program module and/or a processing and memory unit. A control means can hence likewise be a hardware control of a robot, in particular its control cabinet and/or a computer for programming the robot as well as also a program (subroutine) running in it.

The invention is based on the idea of using a redundancy of a robot to reduce the consequences of a collision of a contact point of the robot with its surroundings, in particular with the human being: a redundant robot has a different hazard potential in different redundant poses. By selecting a favorable pose, for example in the case of a path plan, thus the consequences of a collision can be reduced in the case of constant operating speed. Similarly, it is possible to increase the operating speed and thus increase the performance of the robot.

In accordance with the invention, it is therefore proposed to minimize a pose-dependent inertia variable of the robot to resolve the redundancy. A reduction of an inertia variable reduces the impulse or impact which the robot maps onto the obstacle in the event of a collision and thus its hazard potential.

In one preferred design this inertia variable, in particular on the basis of joint coordinates and/or a predefined direction, is determined in advance, i.e. offline, or during operation, i.e. online. The determination on the basis of joint coordinates projects the physical inertias, for example link masses, in the direction of the degrees of freedom of the robot and is therefore advantageous in order to resolve its redundancy. The determination on the basis of one or more predefined directions makes it possible to specifically minimize the hazard potential for this direction(s). In particular, the inertia variable can be determined on the basis of a predefined direction of movement and/or at least of a possible collision-direction of impact of the robot, which for example can arise from a path plan, a manual control for teaching or the like. If the robot moves in this predefined direction, it has a reduced hazard potential in the case of a collision.

In particular, the inertia variable can comprise, preferably be an effective mass, an effective moment of inertia and/or a pseudo matrix of the kinetic energy $\Lambda_v$, $\Lambda_w$. In square format $$\frac{1}{2} \dot{q}^T \cdot M(q) \cdot \dot{q}$$

of the kinetic energy the mass matrix M(q) describes the inertia properties of the manipulator in the configuration space. Also for redundant manipulators the Jacobi matrices of the translation and rotation $$J = \begin{pmatrix} J_v \\ J_\omega \end{pmatrix}$$

the translational or rotational pseudo matrix of the kinetic energy $\Lambda_v, \Lambda_w$ is defined by:

$$\Lambda_v^{-1}(q) = \underbrace{\left(\frac{\partial x}{\partial q}\right)}_{J_v(q)} \cdot M^{-1}(q) \cdot J_v^T(q) \qquad (1)$$

-continued $$\Lambda_\omega^{-1}(q) = \underbrace{\left(\frac{\partial \dot{\alpha}}{\partial \dot{q}}\right)}_{J_\omega(q)} \cdot M^{-1}(q) \cdot J_\omega^T(q)$$

where preferably one or more possible contact points of the robot, with which it could collide with its surroundings, in particular with a cooperating human being, or also an outstanding reference point such as in particular its TCP, a center of mass of a robot-guided useful load or an operating point of a robot-guided tool can be selected as a reference point with the coordinates $z^T = (x^T \alpha^T)$.

For a direction predefined by the unit vector u $$\frac{1}{m_u(\Lambda_v)} = u^T \cdot \Lambda_v^{-1}(q) \cdot u \quad (2)$$

$$\frac{1}{I_u(\Lambda_\omega)} = u^T \cdot \Lambda_\omega^{-1}(q) \cdot u$$

describes the effective mass $m_u(\Lambda_v)$ or the effective moment of inertia $I_u(\Lambda_\omega)$. along the direction or around the axis of rotation u, i.e. in each case on the basis of the direction u. They graphically describe the translational or rotational inertia of the (redundant) manipulator along the direction or around the axis of rotation.

In the following the invention will be further explained in particular using the example of the effective mass which arises for the TCP as a reference point and whose direction of movement is predefined by u. However, in addition or as an alternative, other directions, for example directions of movement, as result in the event of a malfunction of drives of the robot, and/or other points, for example vertices of the robot, which are especially collision-endangered, can be applied. In addition or as an alternative to one or more effective masses, for example eigenvalues of the pseudo matrices of the kinetic energy can be applied as inertia variables.

With the effective mass $m_u(\Lambda_v(q))$, a mathematical inertia variable can be determined for each pose of the robot clearly predefined by the joint angle q. This can be used in one design as a quality criterion of a path plan. In the process, the inventive minimized inertia variable can constitute the only quality criterion of a path plan. Similarly, it can be taken into consideration, in particular as a weighted quality, together with other quality criteria such as an energy optimality, a distance to obstacles, unique, target and/or previous poses, for example in a Pareto- or functional optimization. Thus, for example in the case of a path plan the achievement of target poses can be predefined as a quality criterion or second-order condition, the minimization of the inertia variable as (a further) quality criterion.

In particular in the case of an optimization within the scope of a path plan or in the case of online control of the robot, for example when approaching reference poses to be taught, in one advantageous improvement a gradient of the inertia variable, preferably numerical, in particular discretized, can be determined and a pose of the robot can be varied in one direction of this gradient. If the effective mass $m_u(\Lambda_v(q))$ is again applied as an example, a gradient has $$\nabla m_u = \left(\frac{\partial m_u}{\partial q}\right) \approx \left(\frac{m_u(q_2) - m_u(q_1)}{q_2 - q_1}\right) \quad (3)$$

in the direction of the greatest increase of the effective mass. By changing the pose in negative gradient direction corresponding poses can be determined with lower effective masses.

In addition or as an alternative to such a gradient-based minimization, an inertia variable can also be minimized in one preferred design by determining the associated inertia variable in each case for two or more redundant poses and selecting the pose with a lower, in particular with the lowest inertia variable. As becomes clear in particular from this, a minimization within the meaning of the present invention is defined in particular as the selection of a pose which has a smallest inertia variable at least locally. In the process however, the invention is not restricted to such an absolute minimization; on the contrary, for improvement of the operation of the robot, in particular for reduction of its hazard potential and/or improvement of its performance through a higher operating speed it can be sufficient to select the pose with the smaller inertia variable of two or more redundant poses. Therefore, for more compact representation, also a reduction of an inertia variable will be referred to generally as minimization of the inertia variable within the meaning of the present invention.

In particular, when a path of the robot is planned in advance, in one preferred improvement the inertia variable can be minimized for one or more, preferably discrete, in particular equidistant or signalized, for example taught path points. In the process, preferably the path tangent is applied as the predefined direction in the respective path point. If the robot leaves the path that has ben planned in such a way, it has a reduced hazard potential preferably in its movement and thus one possible collision direction or said robot will be able to travel the path more rapidly at equal hazard potential.

In addition or as an alternative, the pose with a minimized inertia variable can be determined in advance and, saved preferably in tabular form, also for one or more, preferably equidistantly distributed spatial points, in particular points of the configuration or workspace of the robot, in each case preferably for one or more directions, for example coordinate axle directions of a global coordinate system. During operation or in the event of planning a path, it is then possible to interpolate or extrapolate from the closest saved poses in order to resolve the redundancy. In this way in the event of low computer performance or CPU time a minimization of the inertia variable can be carried out by resolving the redundancy of the robot. In one preferred improvement the resolution of the redundancy can also take place in several stages, on the one hand for example by determining one or more redundant degrees of freedom in such a way that the inertia variable is minimized, and using other degrees of freedom for representation of predefined reference point coordinates and/or for optimization of other quality criteria. Similarly, optimum poses can also be determined with respect to the inertia variable and other criteria for redundancy resolution and from these poses, for example by averaging, interpolation or the like a pose can be selected.

In one preferred design a pose with minimal inertia variable is predefined as a reference pose, for example as the initial value of an optimization. In one preferred improvement a virtual force is imprinted in the null space of the redundant robot, said virtual force harnessing its kinematics to the reference pose, so that the robot approaches during operation or in the event of path planning of the reference pose. Such null space can for example be imprinted in the case of path planning considering other quality criteria and/or second-order conditions in order at the same time to reduce the hazard potential or achieve better performance.

In the case of the minimization of the inertia variable one or more selected or likewise all degrees of freedom of the robot can be varied. For example, six joints, which represent a complete mapping of the workspace, can be used to achieve a predefined reference point pose, further joints for minimization of the inertia variable. Similarly, it can be advantageous to vary one or more joint coordinates that are closest in basis, for example an angle of rotation for a link arm or carousel, which are ordinarily represented by heavier robot links, for minimization of the inertia variable.

As explained above, by means of an inventive resolution of the redundancy while minimizing a pose-dependent inertia variable of the robot its hazard potential, in particular in the case of constant speed of the robot, can be lowered. Likewise it is possible to increase the speed of the robot at constant or reduced hazard potential. To this end, in one preferred design of the present invention a speed of the robot is predefined such that a pose-dependent motion variable does not exceed a threshold.

The motion variable can in particular contain, or in particular be a product of the inertia variable and of a power of a speed of the robot or one of its derivatives. If in one preferred improvement the inertia variable is the effective mass, its product with the speed of the reference point in the predefined direction of movement or also its product with the square of this speed can be determined as the motion variable. The former corresponds to an impulse projected in the direction of movement; the latter corresponds to a kinetic energy projected in the direction of movement. If one correspondingly predefines the speed of the robot, at which for example it travels a geometrically predefined path, it can travel the path as quickly as possible, wherein its hazard potential, described by the projected impulse or the projected kinetic energy, remains below a predefined threshold.

BRIEF DESCRIPTION OF THE FIGURES

Additional advantages and features arise from the subsidiary claims and the exemplary embodiments. To this end, the figures, partially in schematic form, show the following:

DETAILED DESCRIPTION

Figure 1:
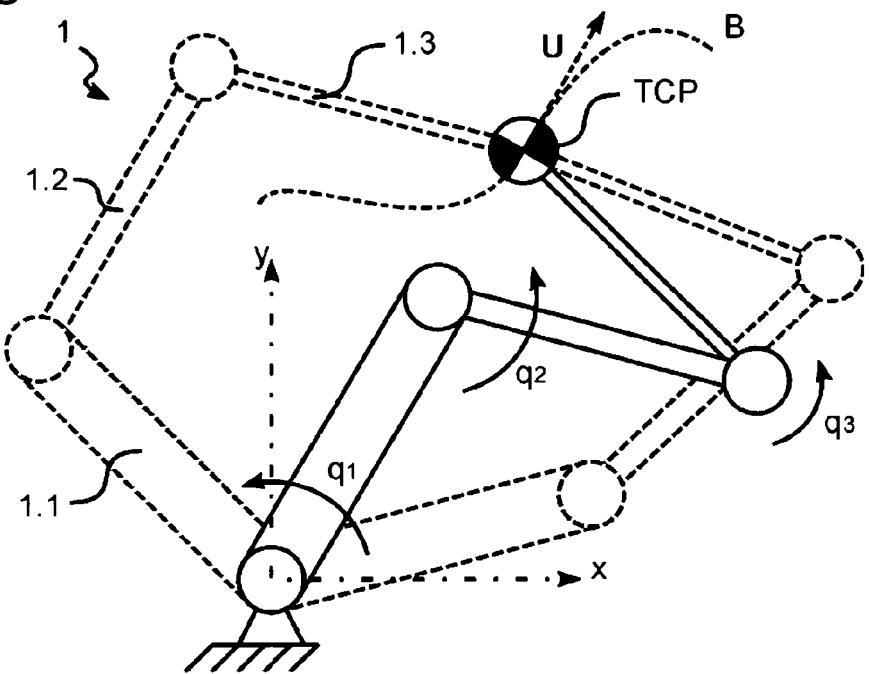
FIG. 1: shows a task-redundant robot in different poses.

In an exemplary embodiment simplified for illustrative purposes, FIG. 1 shows a three-joint robot 1 with a heavy link arm 1.1 supported on a fixed base, a distinctly lighter arm 1.2 flexibly mounted to it and a light hand 1.3 flexibly supported on its end opposite the link armwith the TCP. All three rotary joints have parallel axes of rotation that are vertically upright on the drawing plane of FIG. 1.

If the task of a robot 1 consists in traveling a path B on the drawing plane with its TCP without consideration of its orientation, the robot is redundant with its three degrees of freedom $q(q_1, q_2, q_3)^T$ with respect to the predefined position $z=x=(x\ y)^T$: one recognizes that different, redundant poses exist to the same Cartesian TCP position (x, y) on path B on the drawing plane of FIG. 1 or the workspace of the robot, said different, redundant positions of which FIG. 1 shows three.

If one calculates the effective mass $m^u(\Lambda_v(q))$ for each of these poses according to Eq (2) with respect to the tangent unit vector u to path b in the point (, y), the lowest effective mass results for the pose represented in solid lines, since here the projection of the mass of the massive link arm 1.1 disappears. Accordingly, in the case of planning a path for traveling path B with the TCP the redundancy is resolved as a result of the fact that for each sampling point the pose with the lowest effective mass is selected and predefined as the target pose. This can, as explained above, take place by determining the inertia variables $m_u(\Lambda_v(q_{i,j}))$ for different redundant joint angle sets $q_i$, which each yield the same TCP sampling position $(x, y)_j$, and the selection of the joint angle combination with the lowest effective mass. Similarly, it is possible to determine in advance and save the pose $q^*_{a,b,c}$ with the minimum effective mass for equidistant spatial points $(x_a, y_b)$ and directions $u_c$. In the planning of path B or likewise also with a manual online control of the robot 1 a position can then be automatically varied in the direction of the closest of these saved, hazard optimal poses while retaining the TCP position and considering the predefined direction of movement. Instead of this, the effective mass, in analytical or numerical form equally, can also be considered as a quality criterion in the planning of the path.

Figure 2:
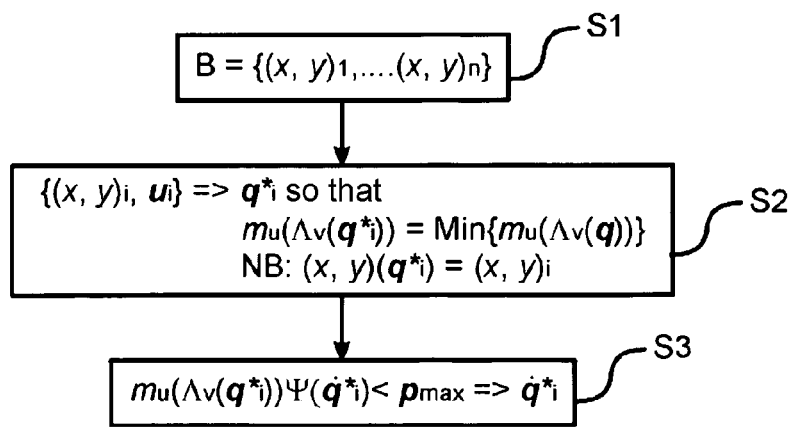
FIG. 2: shows the course of an inventive method.

FIG. 2 illustrates this method in schematic form: in a first step S1 sampling points $(x, y)_1, (x, y)_2, \ldots$ are predefined for the TCP in order to travel path B with said TCP.

Then, in step S2 a predefined direction of movement $u_1$ is first determined for each of these sampling points (x, y) as a unit tangent vector to the path.

Then, in an optimization the pose $q^*_i$ is determined, which meets the second-order condition ("NB"): $(x,y)(q^*_i)=(x, y)_i$, i.e. in which pose the TCP occupies the predefined sampling point, and in the event that the effective mass $m_u(\Lambda_v(q^*_i))$ according to Eq (2) is minimal, i.e. less than the effective mass $m_u(\Lambda_v(q_i))$ or at least one other redundant pose, for which the following applies: $(x, y)(q_i)=(x, y)_i$.

Finally, in a step S3 the driving speed $\dot{q}_i$ of the robot is defined such that a function, in particular the product of the effective mass and the Cartesian TCP speed $(\dot{x},\dot{y})_i=\psi(\dot{q}_i)$ remains below a threshold. As becomes clear from this, the speed which is predefined (here the joint angle speed $\dot{q}_i$) and the speed which is used for determining the inertia variable do not have to be identical, however this can be the case if for example the TCP speed is predefined.

REFERENCE LIST

1 Robot
1.1 Link arm (light)
1.2 Arm (light)
1.3 Hand
B Path
TCP Tool Center Point (reference point)

We claim:

1. A method for controlling a robot having a plurality of successive links driven by motors actuated by a controller, wherein a robot-specific or task-specific redundancy of the robot is resolved, the method comprising:
   minimizing a pose-dependent inertia variable of the robot in the controller for resolution of the redundancy; and
   operating the robot with the controller at a speed that is higher than the operating speed of the robot prior to resolving the redundancy, or
   operating the robot with the controller in a pose selected to reduce the consequences of a collision and at a speed that is equal to or higher than the operating speed of the robot prior to resolving the redundancy.

2. The method according to claim 1, wherein the inertia variable includes at least one of an effective mass, an effective moment of inertia, or a pseudo matrix of a kinetic energy of the robot.

3. The method according to claim 1, wherein the inertia variable is determined in advance or during operation.

4. The method according to claim 1, further comprising using the inertia variable as a quality criterion of a path plan.

5. The method according to claim 1, further comprising:
determining a gradient of the inertia variable; and
varying a pose of the robot in a direction of the determined gradient.

6. The method according to claim 1, further comprising:
determining the inertia variable for at least two redundant poses; and
selecting the redundant pose with the lower inertia variable.

7. The method according to claim 1, further comprising:
predefining a pose having a minimal inertia variable as a reference pose.

8. The method according to claim 1, further comprising:
varying one or more degrees of freedom of the robot for minimization of the inertia variable.

9. The method according to claim 1, wherein the pose-dependent motion variable contains a product of the inertia variable and a power of a speed of the robot or derivative of a speed of the robot.

10. The method according to claim 3, wherein the inertia variable is determined on the basis of at least one of joint coordinates or a predetermined direction.

11. The method of claim 6, wherein the inertia variable is determined for at least one of a path or a spatial point.

12. A controller for controlling a human-collaborating robot, the controller comprising:
a processing unit; and
a memory unit operatively coupled to the processing unit and containing a program that, when executed by the processing unit, causes the controller to:
resolve a robot-specific or task-specific redundancy of the robot by minimizing a pose-dependent inertia variable of the robot; and
operate the robot with the controller at a speed that is higher than the operating speed of the robot prior to resolving the redundancy, or
operate the robot with the controller in a pose selected to reduce the consequences of a collision and at a speed that is equal to or higher than the operating speed of the robot prior to resolving the redundancy.

13. A computer program product comprising:
a non-transitory computer readable storage medium; and
a program stored on the non-transitory computer readable storage medium that, when executed by a processing unit, causes the processing unit to:
resolve a robot-specific or task-specific redundancy of the robot by minimizing a pose-dependent inertia variable of the robot; and
operate the robot with the controller at a speed that is higher than the operating speed of the robot prior to resolving the redundancy, or
operate the robot with the controller in a pose selected to reduce the consequences of a collision and at a speed that is equal to or higher than the operating speed of the robot prior to resolving the redundancy.

14. A method for controlling a robot having a plurality of successive links driven by motors actuated by a controller, wherein a robot-specific or task-specific redundancy of the robot is resolved, the method comprising:
minimizing a pose-dependent inertia variable of the robot in the controller for resolution of the redundancy; and
operating the robot with the controller at a speed that is higher than the operating speed of the robot prior to resolving the redundancy.

* * * * *